(12) United States Patent
Kitamura et al.

(10) Patent No.: US 11,027,200 B2
(45) Date of Patent: Jun. 8, 2021

(54) GAME DEVICE, METHOD AND NON-TRANSITORY COMPUTER-READABLE STORAGE MEDIUM

(71) Applicant: CAPCOM CO., LTD., Osaka (JP)

(72) Inventors: Kazuki Kitamura, Osaka (JP); Hideki Hosoi, Osaka (JP); Yuichi Sakatani, Osaka (JP); Kazuki Sakakibara, Osaka (JP)

(73) Assignee: CAPCOM CO., LTD., Osaka (JP)

( * ) Notice: Subject to any disclaimer, the term of this patent is extended or adjusted under 35 U.S.C. 154(b) by 611 days.

(21) Appl. No.: 15/320,983

(22) PCT Filed: Mar. 12, 2015

(86) PCT No.: PCT/JP2015/057310
§ 371 (c)(1),
(2) Date: Dec. 21, 2016

(87) PCT Pub. No.: WO2015/198646
PCT Pub. Date: Dec. 30, 2015

(65) Prior Publication Data
US 2017/0151501 A1    Jun. 1, 2017

(30) Foreign Application Priority Data

Jun. 25, 2014   (JP) .............................. JP2014-130016

(51) Int. Cl.
*A63F 13/50*      (2014.01)
*A63F 13/54*      (2014.01)
(Continued)

(52) U.S. Cl.
CPC .............. *A63F 13/50* (2014.09); *A63F 13/25* (2014.09); *A63F 13/5378* (2014.09); *A63F 13/54* (2014.09); *A63F 13/57* (2014.09)

(58) Field of Classification Search
CPC ...... A63F 13/57; A63F 13/5378; A63F 13/50; A63F 13/25; A63F 13/54
See application file for complete search history.

(56) References Cited

U.S. PATENT DOCUMENTS 5,862,229 A * 1/1999 Shimizu .................. A63F 13/54
381/17
5,993,318 A * 11/1999 Kousaki .................. A63F 13/10
463/35

(Continued)

FOREIGN PATENT DOCUMENTS

JP   2000-267675 A   9/2000
JP   2002-085831 A   3/2002
(Continued)

OTHER PUBLICATIONS

Internal Search Report dated Apr. 28, 2015 issued in corresponding International application No. PCT/JP2015/057310.

*Primary Examiner* — Malina D. Blaise
(74) *Attorney, Agent, or Firm* — IP Business Solutions, LLC

(57) ABSTRACT

A distance measuring unit 331 measures a distance of a path of sound based on the number of map units between the map unit where a sound source is located and the map unit where a player character is located. An effect unit 332 attenuates the volume of a game sound based on the distance calculated by the distance measuring unit 331. Thereby, it is possible to attenuate the volume level of the sound effect depending on the distance where the sound is transmitted, even if the sound comes around an object obstructing sound.

12 Claims, 10 Drawing Sheets

(51) Int. Cl.
*A63F 13/25* (2014.01)
*A63F 13/5378* (2014.01)
*A63F 13/57* (2014.01)

(56) References Cited

U.S. PATENT DOCUMENTS

| | | | | |
|---|---|---|---|---|
| 6,572,475 | B1* | 6/2003 | Okabe | A63F 13/10 463/30 |
| 7,027,600 | B1* | 4/2006 | Kaji | A63F 13/10 381/17 |
| 7,319,760 | B2* | 1/2008 | Sekine | H04S 7/30 381/17 |
| 7,386,140 | B2* | 6/2008 | Ogata | H04S 3/002 348/E5.125 |
| 7,397,923 | B2* | 7/2008 | Konagai | H04R 3/12 381/17 |
| 7,480,386 | B2* | 1/2009 | Ogata | G10L 21/00 381/306 |
| 8,133,117 | B2* | 3/2012 | Ueda | A63F 13/52 463/35 |
| 8,466,363 | B2* | 6/2013 | Tsuchida | A63F 13/40 84/602 |
| 2004/0157661 | A1* | 8/2004 | Ueda | A63F 13/52 463/31 |
| 2009/0137314 | A1* | 5/2009 | Nakayama | A63F 13/10 463/35 |
| 2009/0180624 | A1* | 7/2009 | Nakayama | A63F 13/10 381/17 |
| 2009/0240359 | A1* | 9/2009 | Hyndman | H04L 65/4015 700/94 |
| 2009/0318225 | A1* | 12/2009 | Yamaguchi | A63F 13/54 463/32 |
| 2013/0094669 | A1* | 4/2013 | Kono | G10L 25/48 381/107 |
| 2015/0057083 | A1* | 2/2015 | Mehra | A63F 13/54 463/35 |

FOREIGN PATENT DOCUMENTS

| | | |
|---|---|---|
| JP | 2007-180935 A | 7/2007 |
| JP | 2007-236833 A | 9/2007 |
| JP | 2007-289713 A | 11/2007 |
| JP | 2008-188308 A | 8/2008 |
| JP | 2010-029375 A | 2/2010 |
| JP | 2010-035978 A | 2/2010 |
| JP | 2011-028169 A | 2/2011 |
| JP | 2011-518366 A | 6/2011 |
| JP | 2013-102411 A | 5/2013 |

* cited by examiner (a)

| Action | Body part | Material | |
|---|---|---|---|
| Walk | Upper body | Iron | 80% |
| | | Leather | 20% |
| | | Cloth | 0% |
| | | Wood | 0% |
| | Lower body | Iron | 10% |
| | | Leather | 80% |
| | | Cloth | 10% |
| | | Wood | 0% |
| | Foot | Iron | 5% |
| | | Leather | 0% |
| | | Cloth | 0% |
| | | Wood | 95% |
| Run | Upper body | Iron | 80% |
| | | Leather | 20% |

GAME DEVICE, METHOD AND NON-TRANSITORY COMPUTER-READABLE STORAGE MEDIUM

TECHNICAL FIELD

This invention relates to techniques to represent realistic sound effect.

BACKGROUND OF THE INVENTION

The realistic sound effect is represented by attenuating sound volume level based on a distance from a sound source to a listener. In Japanese Laid-Open Patent Application Publication No. 2011-028169, it is described that more realistic sound effect is represented by attenuating a sound volume level based on a distance and adding reverberant sound depending on characteristics of a transfer medium between sound source and a listener.

However, if there is an object obstructing sound such as a wall between the sound source and the listener, the distance of the path of the sound is different from the distance in a straight line from the sound source to the listener. Therefore, it has been difficult to calculate attenuation of the volume of the sound depending on the distance.

SUMMARY OF THE INVENTION

The present invention has an object to calculate simply the attenuation of the volume of the game sound depending on the distance where the sound is transmitted even if the sound comes around an object obstructing sound.

A game device of the present invention comprises a virtual space generating unit for generating a virtual game space zoned by map units; a storage unit for storing game sound; a route searching unit for searching the shortest route from a sound source to a position of a listening character in a game; a counting unit for counting the number of the map units in the shortest route between the map unit where the sound source is located and the map unit where the listening character is located; a calculating unit for calculating a distance from the sound source to the position of the listener character based on the number of the map units; and a sound processing unit for loading the data of game sound generated by the sound source from the storage unit and attenuating the volume of the game sound based on the distance calculated by the calculating unit.

According to the present invention, it is possible to calculate simply the attenuation of the volume of the game sound depending on the distance even if the sound comes around an object obstructing the sound by searching the shortest route where the sound is transmitted from the sound source to the listener and counting the number of map units and calculating the attenuation of the volume of the game sound based on the number of the map units.

BRIEF DESCRIPTION OF THE DRAWINGS

FIG. 13 is a view showing an example of percentage of materials of equipment which is equipped for each of actions and on each of body parts on a character according to the present embodiment.

DESCRIPTION OF EMBODIMENTS

A game program and a game system according to one embodiment of the present invention will be described with reference to the drawings.

(Game System)

Figure 1:
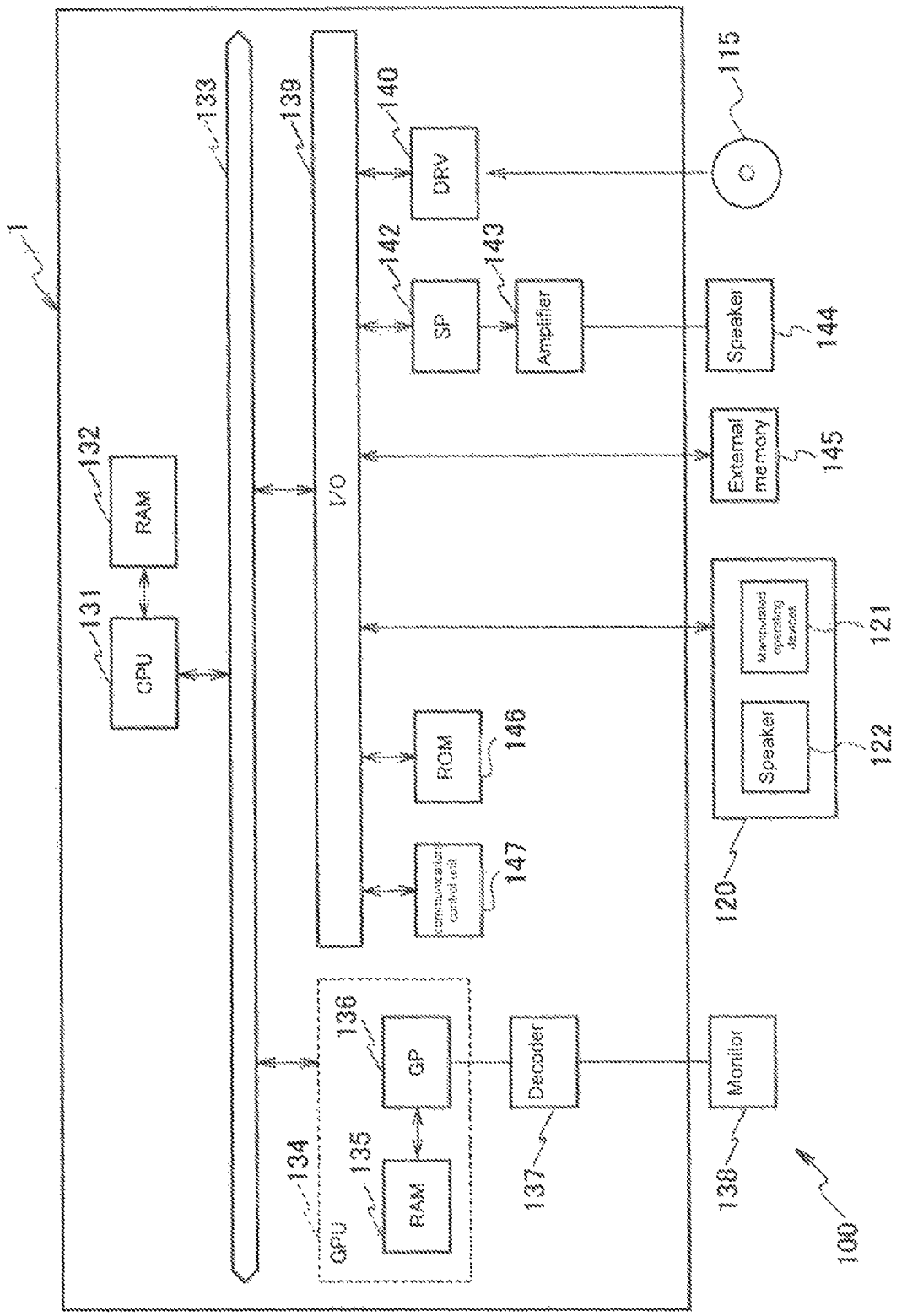
FIG. 1 is a diagram showing a configuration of hardware in a game system according to one embodiment of the present invention.

A game system 100 executing a game program according to one embodiment of the present invention will be described with reference to the FIG. 1. The game system 100 includes a game device (computer) 1, a controller 120, a monitor 138, an external memory 145, a speaker 144, and a storage medium 148.

The game device 1 has a central processing unit (CPU) 131, a random access memory (RAM) 132, a bus 133, a graphic processing unit (GPU) 134, a decoder 137, I/O port 139, a drive (DRV) 140, a sound processor (SP) 142, an amplifier 143, a read only memory (ROM) 146, and a communication control unit 147. The CPU 131 controls all operations of the game device. The RAM 132 stores various data depending on a progress status of the game. The ROM 146 stores a system program for activating and operating basic functions. The GPU 134 has a graphics processor 136 and RAM 135 and draws a game space.

The game program executed on the game device 1 will be described in the present invention, but the game program is not limited to this. The game program may be executed on any device that is a computer having CPU, memory, and so on.

The game program is stored in the storage medium 148 according to one embodiment of the present invention. When the game device 1 reads out the game program from the storage medium 148 inserted in a DRV 140 and executes the program, the GPU 134 draws images of the game space and outputs the images on the monitor via the decoder 137 and SP 142 processes game sounds and outputs the sounds to the speaker via the amplifier 143. A digital versatile disc (DVD), a compact disc (CD), and a hard disk drive are examples of the storage medium 148. If the game device is connected to a communication network, the storage medium 148 may be on the communication network. The communication control unit 147 controls the communication.

The controller 120 is connected to the game device 1 by wireless or wired. When the user has manipulated operating devices 121 such as buttons and sticks, CPU 131 obtains the user's manipulation information and controls the player character and the game space based on the manipulation information. The user's manipulation information includes instructions about actions of the player character such as walking, holding a sword, turning, and obtaining an item, and instructions about progress of the game such as operating a menu. The controller 120 has the speaker 122 and outputs the game sounds received from the game device 1.

The degree of progress of the game may be stored in the external memory 145 as saved data. CPU 131 read out the saved data from the external memory 145 and may let the user play in the middle of the game.

The game is progressed by the game system 100 which comprises the game program and the game device 1 and executes the process corresponding to the operation of the user.

(Game Detail)

Next, the game provided by the game program in the present embodiment is described.

Figure 2:
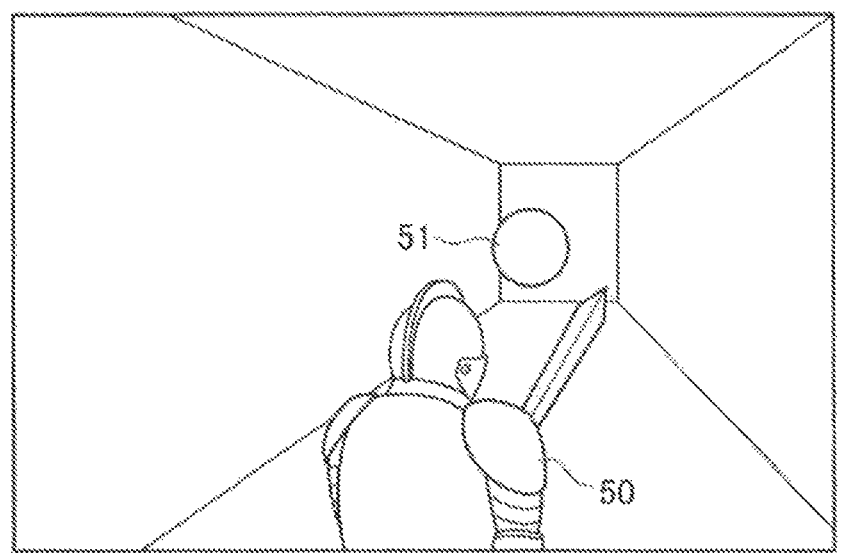
FIG. 2 is a view showing a screen of a game in which a player character is exploring a dungeon according to the present embodiment.

This game is an exploring game in which the player character operated by the user explores a dungeon or inside of a building (hereinafter called dungeon), which is a three dimensional virtual space. FIG. 2 is a view showing a screen of a game in which a player character is exploring the dungeon. A player character 50 and an item 51 located in the dungeon 51 are shown in the game screen. The player character 50 explores the dungeon toward a goal and gets the items 51. Non-player characters (NPC) such as monsters which attack the player character are located in the dungeon (not shown). The monsters obstruct the player character exploring the dungeon. There is an object called Memento in the dungeon. Memento sends a message to the player character. When the user is playing online, there is another player character operated by another user in same dungeon.

Figure 3:
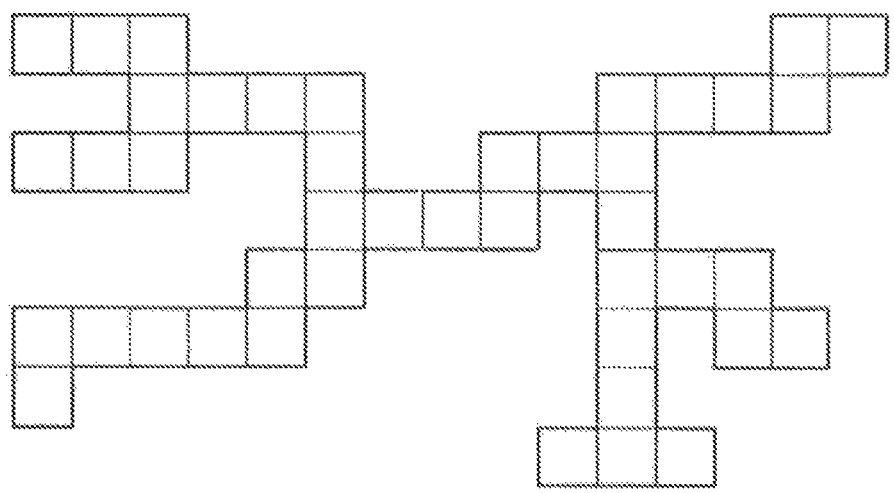
FIG. 3 is a plane view showing an automatically generated dungeon map according to the present embodiment.

The dungeon which the player character explores is generated automatically each time when the player character enters the dungeon. FIG. 3 is a plane view showing an automatically generated dungeon map. As shown in FIG. 3, the map in the game is based on a square cell unit (map unit), and the map is composed by connecting some map units. A joint line between the map units is not displayed in the game screen so that the user does not feel strange. The dungeon in the game is three-dimensional space in which characters can move not only flatly but also to a height direction. Accordingly, the map unit is a three-dimensional cuboid or a cube, and the map is composed by connecting sides of cuboids or cubes to each other. Hereinafter, the map unit is described as if it is a two-dimensional square for simplifying the example.

(Game Device)

Next, the game device executing the game program in the present embodiment is described.

Figure 4:
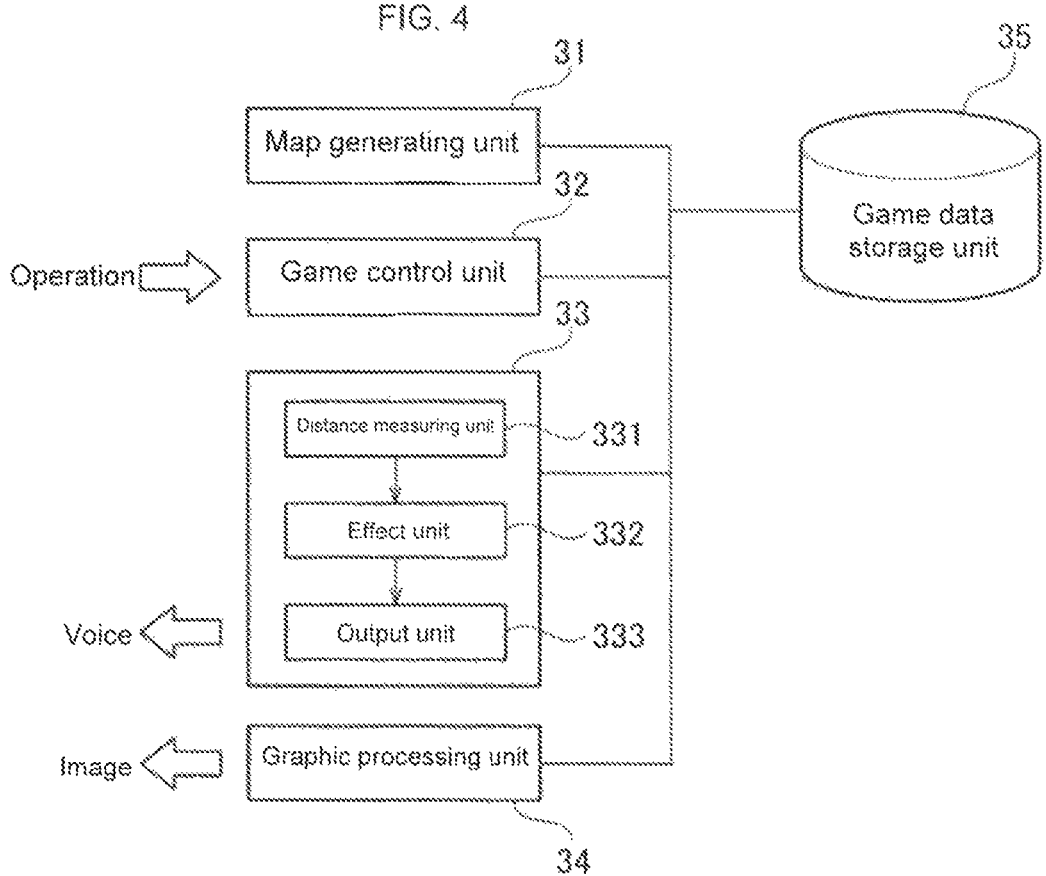
FIG. 4 is a block diagram showing a configuration of a game device according to the present embodiment.

FIG. 4 is a block diagram showing a configuration of a game device executing the game program in the present embodiment. The game device in FIG. 4 has a map generating unit 31, a game control unit 32, a sound processing unit 33, a graphic processing unit 34, and a game data storage unit 35.

The map generating unit 31 generates three-dimensional game space where the player character acts. In particular, the map generating unit 31 generates the game space (dungeon) where the player character can move by lining up the map units, pastes texture in the dungeon according to the theme of the dungeon, sets a light source, and arranges items or the NPC. The map generating unit 31 arranges sound characteristics such as environmental sounds and reverberation characteristics according to the attribute of the map unit. Setting the sound characteristics will be described later.

The game control unit 32 controls the player character in response to the operation input by the user and controls the NPC under a pre-set process to proceed the game.

The sound processing unit 33 outputs the game sounds such as sound effect, back ground music (BGM), and voice to the speaker 122 and 144 according to the progress of the game. The sound processing unit 33 has a distance measuring unit 331, an effect unit 332, and an output unit 333. The sound processing unit 33 attenuates a sound volume level of sound output by a sound source based on a distance from a listening point, which is a player character, to the sound source such as the NPC. The user can choose whether to output the game sounds from the speaker 144 of a television or to output the game sounds from the speaker 122 embedded in the controller 120 in the present embodiment. The sound processing unit 33 processes the game sounds to be suitable to characteristics of the speaker 122 and outputs them when outputting the game sounds from the speaker 122. An attenuation process of the volume of the sound effect and a process of outputting the sound effect to the speaker 122 will be described later.

The graphic processing unit 34 generates an image by rendering the game space, the player character, and the NPC, and outputs it to the monitor 138.

The game data storage unit 35 stores necessary data for the game such as model data of the player character, model data of the monster character, texture data, sound effect data, and BGM data. The game data storage unit 35 stores original sound data of each material which is base data for sound effect synthesized according to material of an equipment and a weapon. A process of synthesizing sound effect will be described later.

(Attenuation Process of the Volume of the Sound)

The attenuation process of the volume of the sound is described next.

The sound processing unit 33 controls the volume of the sound effect (cry and footstep) from the sound source as function of distance from the player character to the sound source in the present embodiment. The sound may be obstructed by the wall in the dungeon. The sound processing unit 33 calculates the distance of the path of the sound in the dungeon and attenuates the sound effect volume level based on the calculated distance. The position of the listening point is regarded as the position of the player character in the virtual game space in the following description.

Figure 5:
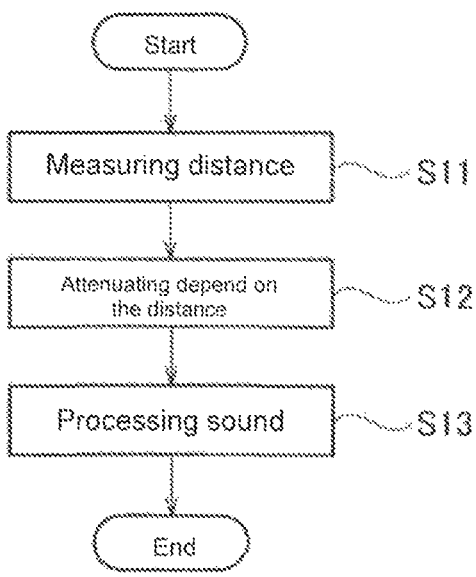
FIG. 5 is a flowchart showing an attenuation process of the volume of the sound effect according to the present embodiment.

FIG. 5 is a flowchart showing the attenuation process of the volume of the sound effect by the sound processing unit 33.

The distance measuring unit 331 measures the distance from the player character to the sound source when the sound effect is generated by the sound source such as NPC emitting the sound (Step S11). In the present embodiment, the distance measuring unit 331 searches the shortest route of the path of the sound from the sound source to the player character based on the map unit. And the distance measuring unit 331 counts the number of the map units of the shortest route of the path and calculates the distance between the sound source and the player character based on the number of the map units. If a straight line between the sound source and the listener passes through a map unit such as a wall which shuts out the sounds, distance measuring unit 331 searches the shortest route of the path to go around this map unit and calculates the distance based on the number of the map units included in the route. A detail of measuring distance will be described later.

After the measuring distance between the sound source and the player character, the effect unit 332 loads the sound data corresponding to the sound effect which the sound source generates from the game data storage unit 35, attenuates the sound volume level based on the distance (Step S12).

Figure 6:
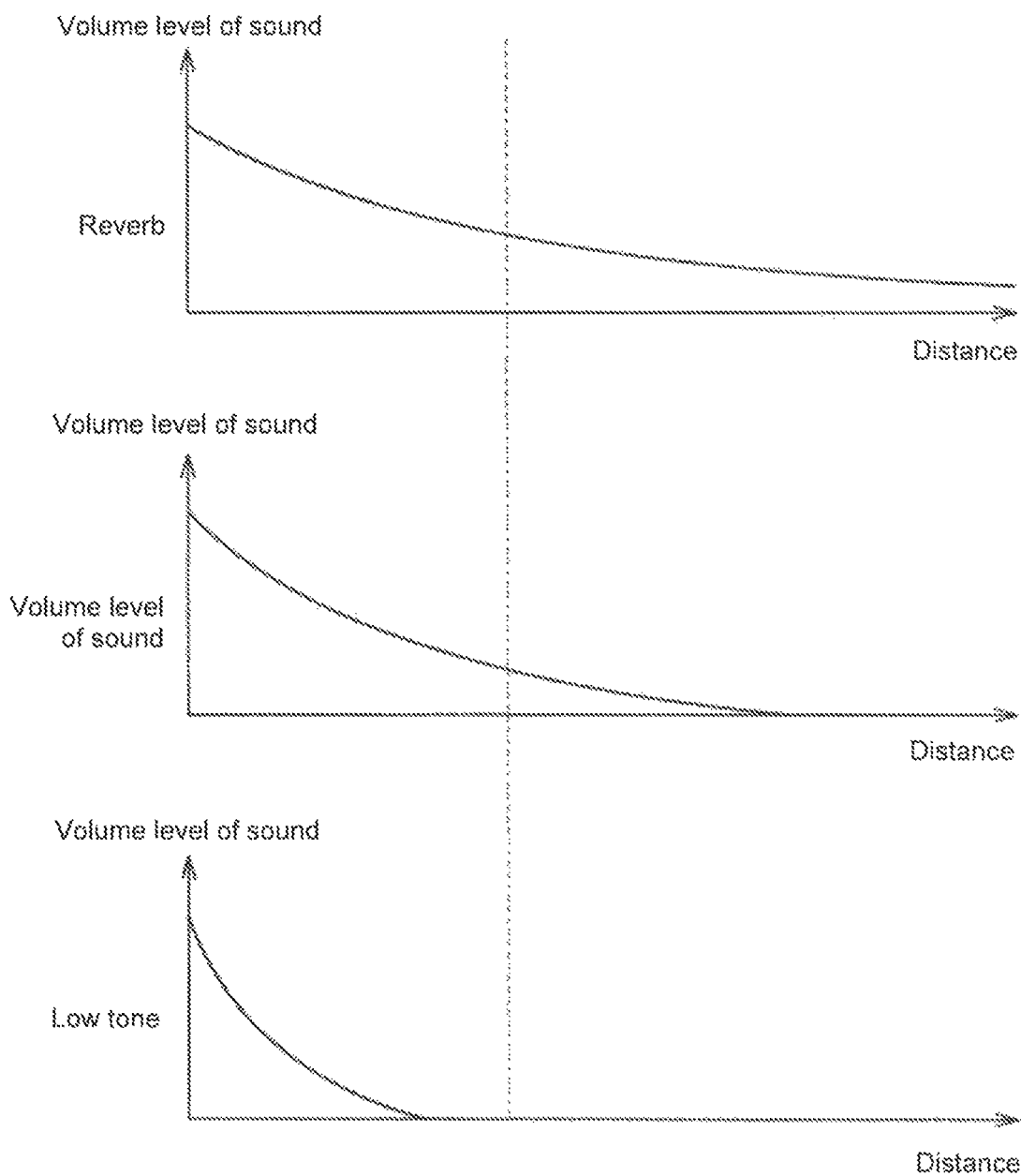
FIG. 6 is a view showing attenuation characteristics of reverb, a total sound volume, and low tone according to the present embodiment.

In the present embodiment, the effect unit 332 attenuates the sounds by using different characteristics for each of reverb (remaining sound), a total sound volume, and low tone as shown in FIG. 6. A horizontal axis shows the distance between the sound source and the player character and a vertical axis shows the sound volume level in FIG. 6. The reverb less attenuates than total sound volume, and the low tone more attenuates the total sound volume. The effect unit 332 calculates each attenuation of the volume of the reverb, the total sound volume, and the low tone depending on the distance measured by the distance measuring unit 331, and the effect unit 332 attenuates each component of the sound effect depending on each attenuation of the volume.

If there is a wall between the sound source and the player character, the effect unit 332 processes sound data to muffled sound (Step S13). In particular, the effect unit 332 decreases the sound volume level of high frequency in the sound data by using a filter.

According to the above process, the sound effect after the attenuation process and the effect process is output from the output unit 333.

(Measuring Distance)

Figure 7:
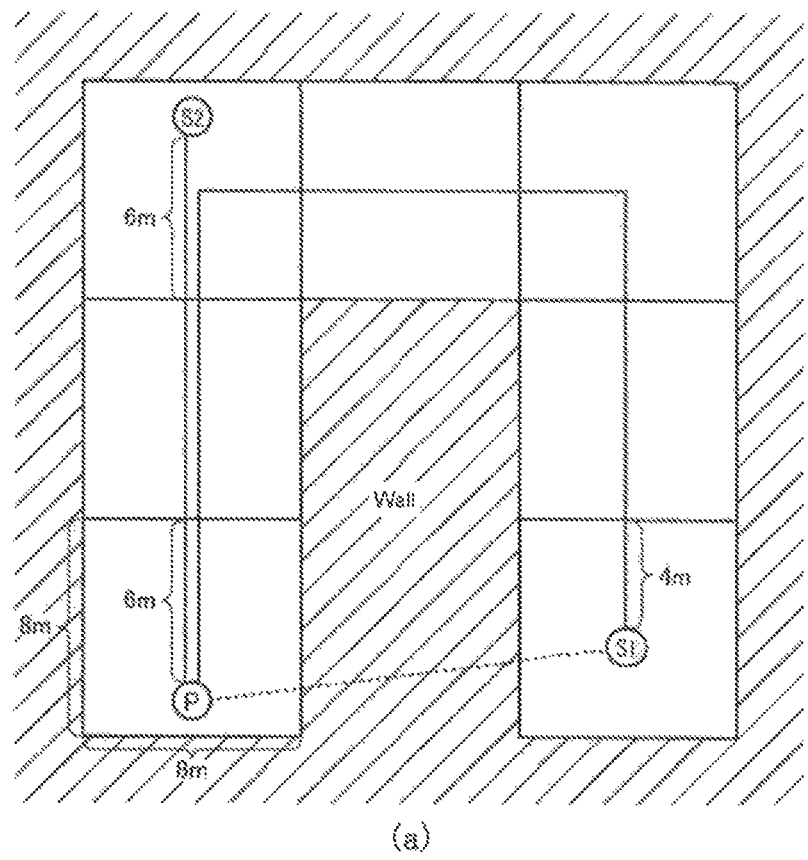
FIG. 7 is a view for explaining how to calculate the distance from the sound source to the listener by counting the number of the map units according to the present embodiment.
Figure 7:
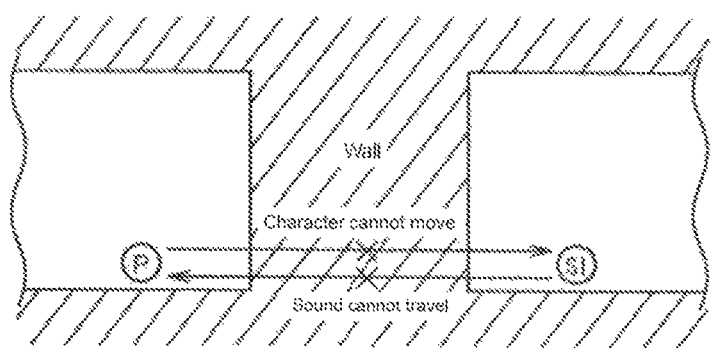
Figure 8:
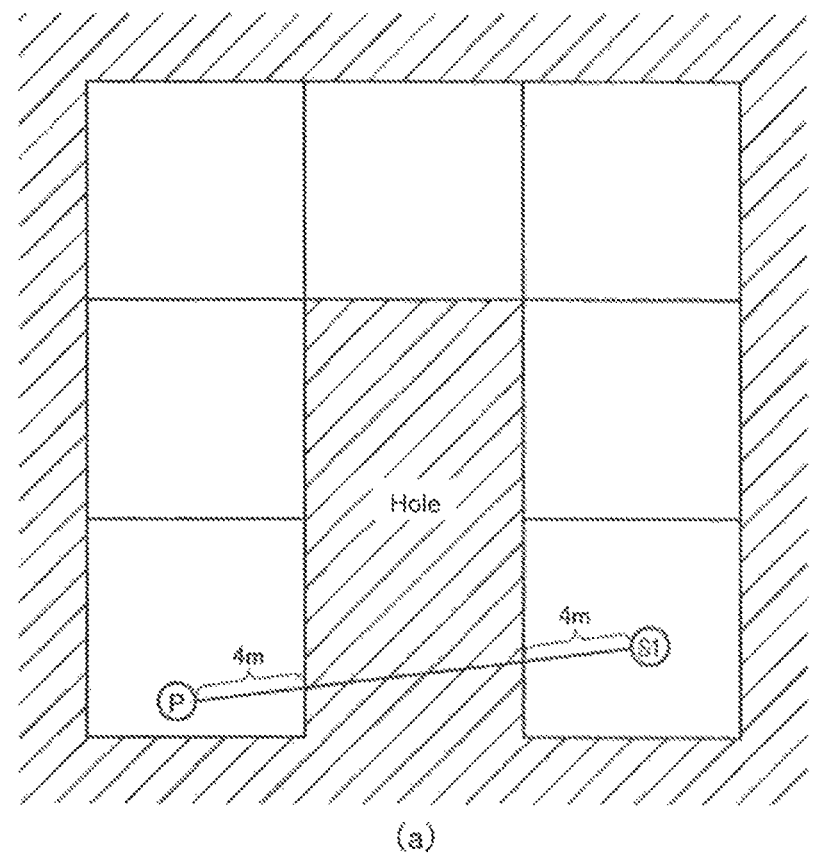
FIG. 8 is a view for explaining how to calculate the distance from the sound source to the listener by counting the number of the map units according to another embodiment of the present invention.
Figure 8:
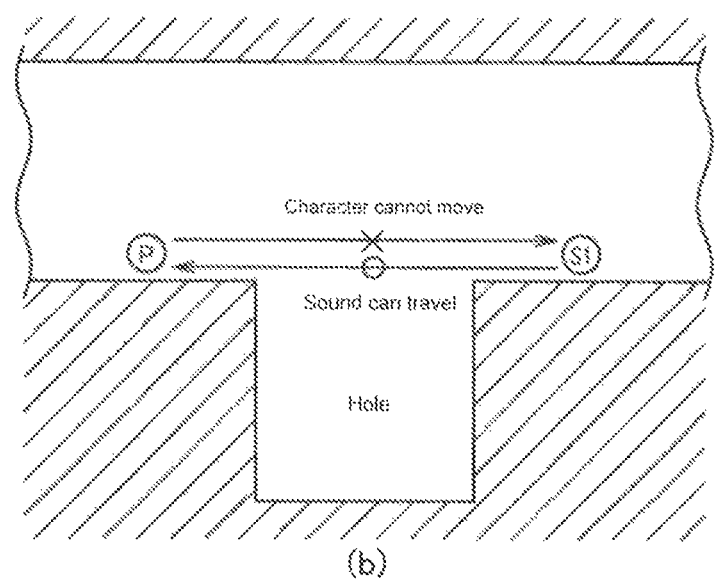

FIG. 7 and FIG. 8 are views for explaining to calculate the distance from the sound source to the player character by counting the number of the map units. FIG. 7A and FIG. 8A are plane diagrams showing the dungeon from above. FIG. 7B and FIG. 8B are cross-sectional diagrams viewing the map unit of the player character and the map unit of the sound source in the dungeon from the side. One map unit shown in FIG. 7A and FIG. 8A is a rectangular parallelepiped whose bottom is 8 meters×8 meters and whose height is about three times higher than the player character (from 6 meter to 7 meters). One map unit below is described as a square whose side is 8 meters×8 meters.

First, the distance from the player character P to the sound source S1 will be described in FIG. 7. There is a wall on a dotted line connecting the player character P and the sound source S1. The wall is set as having a characteristic not passing sound, or the character and sound in the game cannot pass because there is no virtual game space in the position of the wall. Therefore, the distance between the player character P and the sound source S1 is calculated based on the shortest route detouring to avoid the wall, the route passes through the map units set as having a characteristic passing the sound. The shortest route connected to the player character P and the sound source S1 passes through five map units. The distance from the player character P to the adjacent map unit on the route is 6 meters. The distance from the sound source S1 to the adjacent map unit on the route is 4 meters. The distance from the player character P to the sound source S1 is calculated by multiplying the number of the map units on the shortest route by the length of a side of the map unit (8 meters), and adding the distance from the player character P to the adjacent map unit and the distance from the sound source to the adjacent map unit.

In the example of FIG. 7, the distance from the player character P to the sound source S1 is 50 meters (5 map units×8 meters+6 meters+4 meters).

It may be calculated by using only the number of the map unit on the route connected to the player character and the sound source. In this case, the distance from the player character P to the sound source S1 is 40 meters (5 map units×8 meters). Alternatively, it may consider that there are the player character and the sound source in the center of the map unit and that all the distances to the adjacent map unit are 4 meters. In this case, the distance from the player character P to the sound source S1 is 48 meters (5 map units×8 meters+4 meters+4 meters).

Then, it will be described about the distance from the player character P to the sound source S2 in FIG. 7. As shown in FIG. 7A, there is no object obstructing the sounds on the line connecting the player character P and the sound source S2. Therefore, the distance is calculated based on the number of the map units on which the line connected to the player character P and the sound source S2 passes through. The line connected to the player character P and the sound source S2 passes through one map unit. The distance from the player character P to the adjacent map unit is 6 meters. The distance from the sound source S2 to the adjacent map unit is 6 meters. The distance from the player character P to the sound source S2 is 20 meters (1 map unit×8 meters+6 meters+6 meters). If there is no object obstructing the sounds on the line connecting the player character and the sound source, the length of the line connected to the player character and the sound source may be used for the attenuation of the volume of the sound.

Next, an example that there is the map unit which the player character cannot pass through but the sound can pass through between the player character and the sound source is described. FIG. 8 shows the player character P and the sound source S1. There is a hole which the player character cannot pass through on the route connected to the player character and the sound source. The hole is the map unit which the player character cannot pass through like the wall, but the map unit of hole is set as having the characteristic passing the sound, and the sound passes through the hole. In FIG. 8, the map unit between the player character P and the sound source S1 is a hole which the sound passes through; therefore, the distance from the player character P to the sound source S1 is calculated based on the line connected to the player character P and the sound source S1, and a calculated result is one map unit. The distance from the player character P to the adjacent map unit is 4 meters. The distance from the sound source S1 to the adjacent map unit is 4 meters. Accordingly, in the example of FIG. 8, the distance from the player character P to the sound source S1 is 16 meters (1 map unit×8 meters+4 meters+4 meters).

Figure 9:
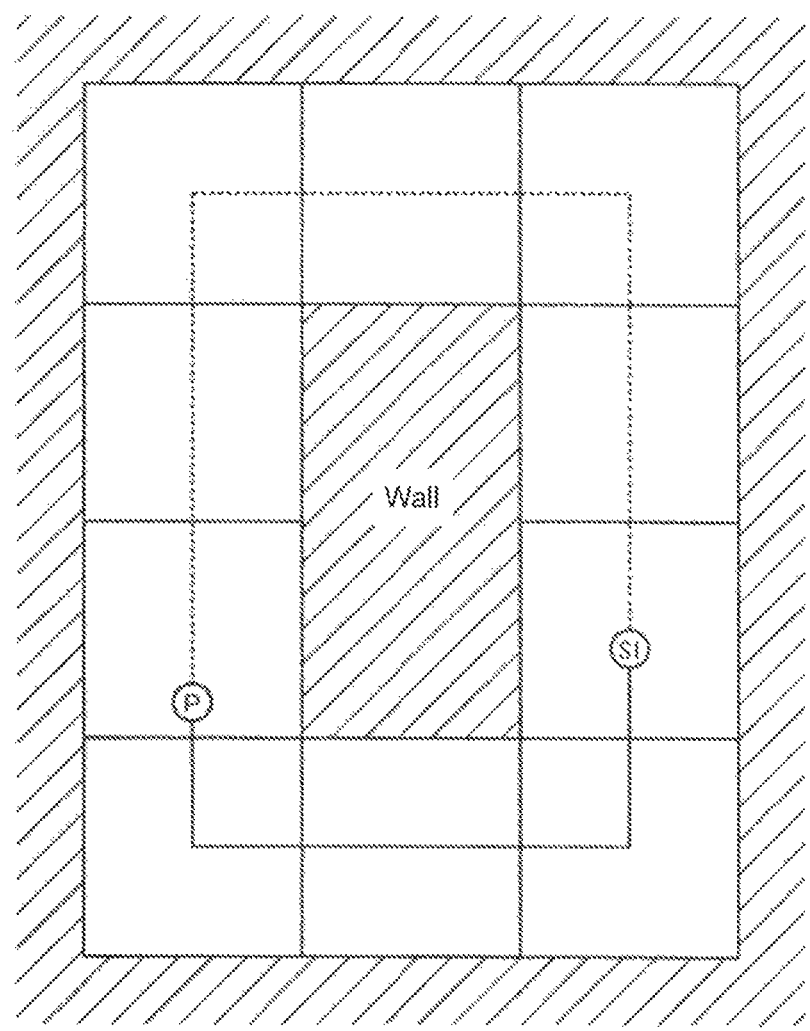
FIG. 9 is a view showing an example of multiple paths going around the wall according to the present embodiment.

FIG. 9 is a view showing an example of multiple paths going around the wall. There is a wall between the player character and the sound source in FIG. 9. The routes going around the wall includes a route described by a dotted line and a route described by a solid line. If there are some routes going around the wall, the route which passes through the less number of the map units is used for the attenuation of the volume of the sound. In FIG. 9, the route described by the dotted line passes through 5 map units; however, the route described by the solid line passes through 3 map units from the sound source S1 to the player character P. Therefore the route described by the solid line is used for the attenuation of the volume of the sound.

Figure 10:
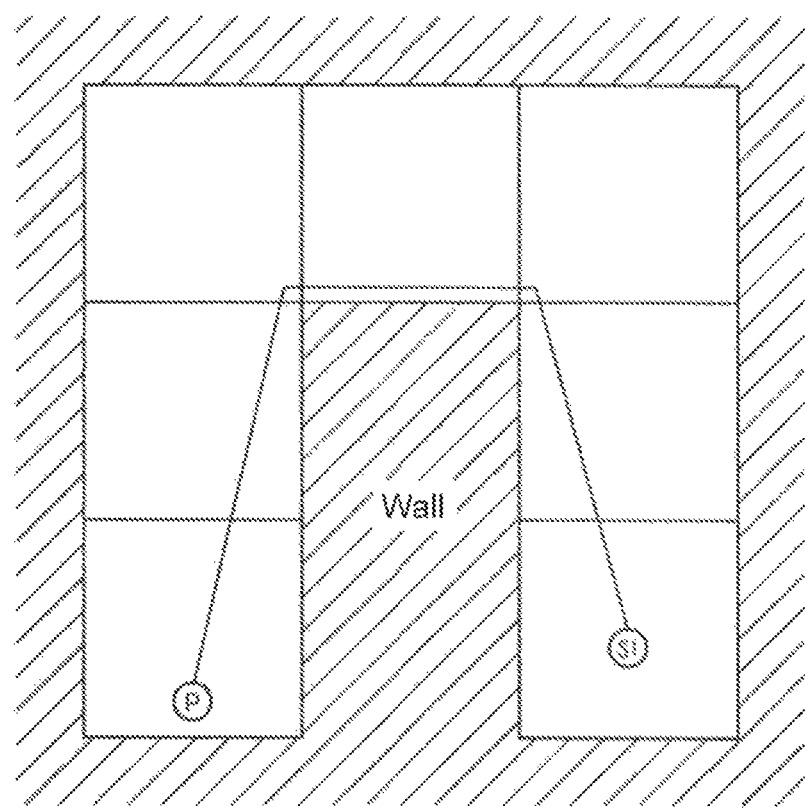
FIG. 10 is a view for explaining how to determine a path for calculating distance from the sound source to the listener according to the present embodiment.

A different way of determining the route used for calculating the distance will be described. In the examples of FIG. 7, FIG. 8 and FIG. 9, the shortest route is calculated by connecting the position of the center of the map unit. As shown in FIG. 10, the distance of the route may be calculated so that the distance from the sound source S1 to the player character P is much shorter. When the route passing any positions in the map units is arranged, the upper left map unit and the upper right map unit are considered excluded in the shortest route in FIG. 10. In this case, the shortest route passes through 3 map units. Also, the distance may be calculated by adding the shortest route (3 map units×8 meters) to the distance from the player character P to the adjacent map unit and the distance from the sound source S1 to the adjacent map unit. Alternatively, the distance may be calculated by adding 1 map unit×8 meters to the distance from the sound source S1 to the corner of the upper right map unit and the distance from the corner of the upper left map unit to the player character P.

As described above, the distance measuring unit 331 calculates the distance of the path of the sound based on the number of the map units located between the map unit where the player character is located and the map unit where the sound source is located, and then the effect unit 332 attenuates sound volume level based on the distance according to the present embodiment. Thereby, it is possible to attenuate the volume of the sound effect depending on the distance of the path of the sound even if the sound comes around an object obstructing sound.

The process of the sound processing unit 33 described above is not limited to an automatically generated map, and the process can be applied to a map zoned by predetermined map units.

(Effect Setting)

Next, setting of the sound characteristics at each point in the map will be described.

The sound characteristics such as environmental sounds and reverberation characteristics differ based on a size of the game space. In the case of a fixed map which is generated in advance, it is possible to arrange in advance the sound characteristics into the fixed map. However, in the case of the automatically generated map, it is necessary to determine the size of the space of each point in the map.

In the automatically generated map, the map units included in a space which is not less than 2×2 map units are regarded as a room, and other map units are regarded as a passage in the present embodiment. Whether one map unit (target map unit) is a room or a passage is determined, as described below.

First, one of 2×2 map units which have a target map unit in a corner is chosen. The 2×2 map units have four patterns, which mean that the target map unit is located in upper right, lower right, upper left, or lower left of the 2×2 map units. It is determined whether three map units except for the target map unit included in the chosen 2×2 map unit are spaces (not a wall map unit). If three map units are all spaces, the four map units including the target map unit are judged as rooms. If any one of the three map units is not a space, another 2×2 map unit is selected and the same processing is carried out. After all of the four patterns have been determined, when the target map unit is not judged as a room in any case, the target map unit is judged as a passage.

Figure 11:
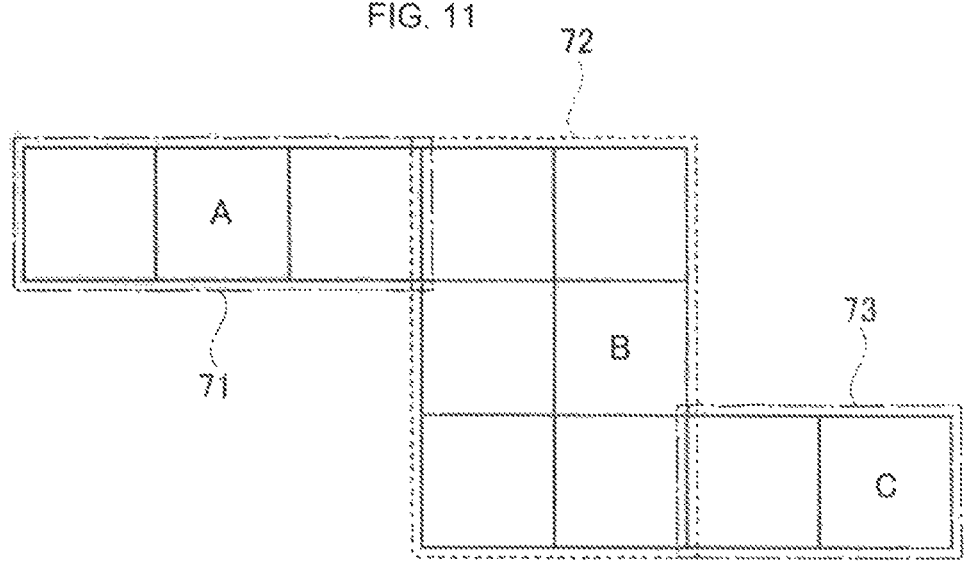
FIG. 11 is a plane view showing a passage and a room in a dungeon map according to the present embodiment.

FIG. 11 shows two passages and a room in the automatically generated map. The map units enclosed by squares indicated by reference characters 71 and 73 are passages because each of their widths is one map unit. The map units enclosed by a square indicated by a reference character 72 are a room because they are space having 2×3 map units. Sound characteristics for a passage are set for each of the map units judged as a passage. Sound characteristics for a room are set for the map units judged as a room. For example, sound characteristics are set so that a sound effect in the map unit judged as a room has much reverb than a sound effect in the map unit judged as a passage.

If the player character and the sound source are located in a different space, the sound characteristics of their spaces may be synthesized. For example, in FIG. 11, when the player character is located at the position A in a passage and the sound source is located at the position B in a room, after applying the sound characteristics for the room to the sound effect output from the sound source on the position B, the sound characteristics for the passage are applied to the sound effect. In another example, when the player character is located at the position A in the passage and the sound source is located at the position C in the passage, after applying the sound characteristics for the passage to the sound effect output from the sound source at the position C, then the sound characteristics for the room are applied, and then additionally the sound characteristics for the passage are applied.

The sound characteristics is not just set based on the characteristic of the map unit such as a room and a passage but predetermined sound characteristics may be set to a location where an event occurs.

As described above, according to the present embodiment, the sound processing unit 33 determines the size of the space in the automatically generated map and the sound characteristics depending on the size of the space is set on the map; therefore, the sound processing unit 33 can set the sound effect based on the size of the space in the map.

(Output from Controller)

Next, the game sounds output from the speaker 122 embedded in the controller 120 will be described.

Recently the game device 1 can output sounds from both the speaker 122 embedded in the controller 120 and the speaker 144 connected to the game device 1

However, the speaker 122 embedded in the controller 120 has lower performance than the external speaker 144. Therefore, if the game sounds generated for being output from the speaker 144 are output from the cheap speaker 122, the sounds which a developer intended cannot be output from the speaker 122.

It is considered that the game sound output from the speaker 122 is limited to operation sounds, and that the sounds for the speaker 144 and the sounds for the speaker 122 are prepared differently. However, when the developer intends to output many game sounds for being output from the speaker 122, it would cost time and data storage for the speaker 122, and it is not realistic in view of data capacity as well.

In this game, voices of Memento object to tell his mind are output from both the speaker 122 and the speaker 144. Because the number of voices of Memento object is very large, it is not realistic to prepare each data for the speaker 122 and for the speaker 144.

The game program processes the game sounds prepared for the speaker 144 to output from the speaker 122 in the present embodiment.

Figure 12:
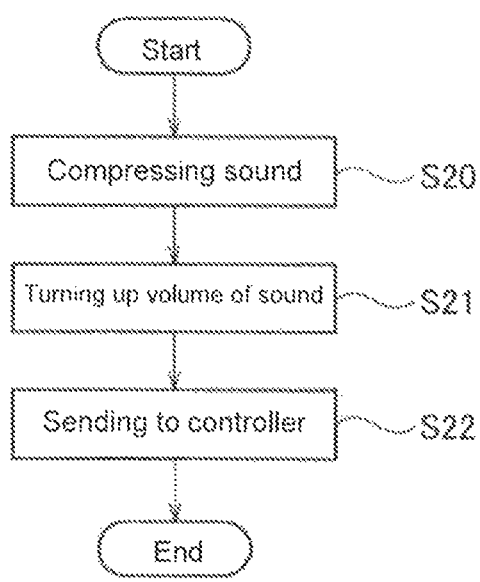
FIG. 12 is a flowchart showing a process of game sounds for a speaker embedded on a controller according to the present embodiment.

FIG. 12 is a flowchart showing a process of game sounds for the speaker embedded the controller.

The sound processing unit 33 loads the game sounds from the data storage unit 35 and compresses the game sounds (Step S20).

Then the sound processing unit 33 turns up the volume of the whole game sounds processed in Step S20 (Step S21). Additionally the sound processing unit 33 may turn up the volume of the sound of a specific frequency range (for example, a frequency range of the voice of Memento object).

The sound processing unit 33 sends the processed data to the controller 120 (Step S22).

As described above, according to the present embodiment, when the game sounds for the speaker 144 such as for TV are output from the speaker 122 embedded in the controller 120, the sound processing unit compresses the game sounds to narrow the dynamic range of the sound, turns up the volume of the whole game sounds, and sends the processed data to the controller 120. Accordingly, the sounds which a developer designed may be output from the speaker 122 without the sound data for the speaker 122.

(Synthesis of Sound Effect)

Then, a synthesis of the sound effect is described.

An online game is updated at a predetermined frequency. When the online game is updated, new equipment and weapons may be added.

It is desired that sound effects for the new equipment and the weapons are generated; however, it is difficult to prepare the sound effects corresponding to the new equipment and weapons every time of the updating.

The sound effects corresponding to the equipment and weapons are generated by synthesizing the sounds based on the materials of the equipment and weapons in the present embodiment.

FIG. 13 is a view showing an example of percentage of materials of equipment for each of actions and body parts in a character. In FIG. 13, the body parts of the equipment are classified into upper body, lower body, and foot, and the materials of the equipment are classified into iron, leather, cloth, and wood. The sound processing unit 33 outputs the sound effect corresponding to the percentage of materials of each body part with actions (motion) of the character. For example, the sound processing unit 33 synthesizes three sound effects of upper body, lower body, and foot for walking motion corresponding to the percentage of the materials of the equipment and outputs the synthesized sound when the character walks.

The game data storage unit 35 stores data of the percentage of the materials of the equipment and the weapons and original sound data of each material for each of the body parts and weapons. For example, when the body parts of the equipment are classified into upper body, lower body, and foot, and the materials of the equipment are classified into iron, leather, cloth, and wood, the game data storage unit 35 stores twelve original sound data, iron for upper body, leather for upper body, cloth for upper body, wood for upper body, iron for lower body, leather for lower body, cloth for lower body, wood for lower body, iron for foot, leather for foot, cloth for foot, and wood for foot, for each motion.

When the sound processing unit 33 outputs sound effect with the motion, the sound processing unit 33 obtains the data of the percentage of materials of the equipment of the character from the game data storage unit 35. Then, the sound processing unit 33 adjusts the volume of the original sound of each material for each body part and synthesizes the original sound data based on the data of the percentage of the materials of the equipment. When the character has changed its equipment, the sound processing unit 33 synthesizes original sound data based on the percentage of the material of the equipment after the change and stores the synthesized sound data in the memory. When the motion of the character is reproduced, the sound processing unit 33 may call original sound data of each material at the same time after the setting of the volume of the original sound In particular, the materials of the equipment of upper body consist of 80 percent iron and 20 percent leather in FIG. 13. When the character wearing the equipment for upper body walks, the sound processing unit 33 synthesizes 80 percent volume of original sound data of iron for upper body and 20 percent volume of original sound data of leather for upper body, and calls the synthesized sound effect. Similarly, the sound processing unit 33 synthesizes the sound based on the percentage of the materials of equipment and calls the synthesized sound effect regarding the sound effect of lower body and foot.

As described above, in the present embodiment, the sound processing unit 33 generates the sound effect of the motion of the character by synthesizing the original sound data of the material based on the percentage of the material of the equipment of the character. Therefore, the developer need not prepare the sound effect for each equipment.

INDUSTRIAL APPLICABILITY

As described above, according to the present invention, it is possible to calculate simply the attenuation of the volume of the game sound corresponding to the distance of the path of the sound, even if the sound comes around an object obstructing the sound.

The invention claimed is:

1. A game device comprising:
a virtual space generating unit for generating a virtual game space zoned by map units, each of which is a square and has a same size;
a storage unit for storing game sound;
a route searching unit for searching the shortest route from a sound source to a listener in a game;
a counting unit for counting the number of the map units in the shortest route between a first map unit where the sound source is located and a second map unit where the listener is located;
a calculating unit for calculating a distance from the sound source to the listener based on the number of the map units; and
a sound processing unit for loading the data of the game sound generated by the sound source from the storage unit and attenuating the volume level of the game sound based on the distance calculated by the calculating unit.

2. The game device according to claim 1, wherein the calculating unit adds the distance from the sound source to an adjacent map unit and the distance from the listener to an adjacent map unit to the distance based on the number of the map units.

3. The game device according to claim 1, wherein the sound processing unit calculates size of a space including the map unit and changes sound characteristics of the game sound emitted at the map unit depending on the size of the space.

4. The game device according to claim 1, further comprising
a first speaker outputting the game sound; and
a second speaker providing lower performance than the first speaker, wherein the sound processing unit compresses the game sound and turns up the volume level of the game sound, and wherein the second speaker outputs the game sound processed by the sound processing unit.

5. The game device according to claim 1, further comprising a synthesizing unit for synthesizing the game sound, wherein the storage unit stores data indicating percentage of material of equipment and game sound for each of the materials, wherein the synthesizing unit configures the volume of the game sounds for each the materials based on the percentage of material of equipment loaded from the storage unit and synthesizes the game sounds for each the materials.

6. A method of processing a sound effect, comprising:

a virtual space generating step by a central processing unit (CPU) for generating a virtual game space zoned by map units, each of which is a square and has a same size;

a route searching step by the CPU for searching the shortest route from a sound source to a listener in a game;

a counting step by the CPU for counting the number of the map units in the shortest route between a first map unit where the sound source is located and a second map unit where the listener is located;

a calculating step by the CPU for calculating a distance from the sound source to the listener based on the number of the map units; and a sound processing step by the CPU for loading the data of game sound generated by the sound source from a storage unit and attenuating the volume level of the game sound based on the distance calculated by the calculating step.

7. The method according to claim 6, wherein the calculating step by the CPU calculates the distance by adding the distance from the sound source to an adjacent map unit and the distance from the listener to an adjacent map unit to the distance based on the number of the map units.

8. The method according to claim 6, further comprising:

a step by the CPU for calculating size of a space including the map unit and changing sound characteristics of the game sound emitted at the map unit depending on the size of the space.

9. The method according to claim 6, further comprising:

a step by the CPU for compressing the game sound and turns up the volume level of the game sound;

a step by the CPU for outputting the game sound to a second speaker providing lower performance than a first speaker.

10. The method according to claim 6, further comprising:

a synthesizing step by the CPU for configuring the volume of the game sounds for each the materials based on the percentage of material of equipment and for synthesizing the game sounds for each the materials.

11. The game device according to claim 1, wherein each of the map units either passes the game sound or blocks the game sound.

12. The game device according to claim 11, wherein the counting unit is for counting the number of the map units which passes the sound.

* * * * *